(12) United States Patent
Mauer et al.

(10) Patent No.: US 7,395,085 B1
(45) Date of Patent: Jul. 1, 2008

(54) METHOD AND SYSTEM FOR NOTIFYING A MULTI-MODE MOBILE STATION OF AN INCOMING CALL

(75) Inventors: Brian D. Mauer, Shawnee, KS (US); Pallavur Sankaranaraynan, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 482 days.

(21) Appl. No.: 11/078,981

(22) Filed: Mar. 11, 2005

(51) Int. Cl.
*H04B 1/38* (2006.01)
*H04M 1/00* (2006.01)

(52) U.S. Cl. .................... 455/552.1; 455/567

(58) Field of Classification Search ............. 455/412.2, 455/413, 458, 550.1, 552.1, 567; 370/338
See application file for complete search history.

(56) References Cited

U.S. PATENT DOCUMENTS

| | | | |
|---|---|---|---|
| 5,594,782 A | 1/1997 | Zicker et al. | |
| 5,706,331 A * | 1/1998 | Wang et al. | 455/426.1 |
| 6,366,660 B1 | 4/2002 | Baiyor et al. | |
| 6,480,720 B1 * | 11/2002 | Coan et al. | 455/458 |
| 6,526,034 B1 | 2/2003 | Gorsuch | |
| 6,574,470 B1 | 6/2003 | Chow et al. | |
| 6,587,683 B1 | 7/2003 | Chow et al. | |
| 6,680,923 B1 | 1/2004 | Leon | |
| 2002/0085516 A1 | 7/2002 | Bridgestall | |
| 2002/0147008 A1 | 10/2002 | Kallio | |
| 2002/0191557 A1 | 12/2002 | Chow et al. | |
| 2002/0191635 A1 | 12/2002 | Chow et al. | |
| 2002/0198020 A1 | 12/2002 | Mooney | |
| 2003/0013489 A1 | 1/2003 | Mar et al. | |
| 2003/0039242 A1 | 2/2003 | Moore | |
| 2004/0002330 A1 * | 1/2004 | Chitrapu | 455/426.2 |
| 2004/0180654 A1 | 9/2004 | Chen | |
| 2004/0203836 A1 * | 10/2004 | Gorday et al. | 455/454 |

* cited by examiner

*Primary Examiner*—Nguyen Vo

(57) ABSTRACT

A multi-mode mobile station includes a first interface for wireless communication with a first wireless network, such as a wireless local area network (WLAN), and a second interface for wireless communication with a second wireless network, such as a wireless wide area network (WWAN). When a call is placed to the multi-mode mobile station, a softswitch or other controller attempts to establish the call with the multi-mode mobile station via the first wireless network. If this attempt is unsuccessful because the multi-mode mobile station is inaccessible via the first wireless network, the controller then attempts to establish the call via the second wireless network.

20 Claims, 5 Drawing Sheets

METHOD AND SYSTEM FOR NOTIFYING A MULTI-MODE MOBILE STATION OF AN INCOMING CALL

BACKGROUND

1. Field of the Invention

The present invention relates to telecommunications and, more particularly, to a method and system for notifying a multi-mode mobile station of an incoming call.

2. Description of Related Art

There is an increased interest in using more diverse types of wireless access technologies for mobile devices. Different wireless access technologies may be used to provide wireless coverage in different geographic areas. In addition, different wireless access technologies may be used to provide different capabilities for transmitting and receiving voice, data, and/or other media. For example, wireless wide area networks (WWANs), which often use wireless access technologies such as CDMA, TDMA, or GSM, typically provide wireless coverage in relatively large geographic areas. However, in many cases, WWANs do not provide good wireless coverage in buildings. In addition, many WWANs have a relatively limited bandwidth for transmitting and receiving media. However, wireless local area networks (WLANs), which may use wireless access technologies, such as IEEE 802.11, Bluetooth, HiperLAN, and Multichannel Multipoint Distribution Service (MMDS), have been used to provide wireless coverage in more limited areas, such as the inside of buildings. In addition, WLANs can often transmit and receive media at a higher rate than many WWANs.

With this increased interest in using diverse wireless access technologies to provide wireless coverage has come an increased interest in providing multi-mode mobile stations that can communicate using more than one type of wireless access technology. For example, a multi-mode mobile station may have one interface for communication with a WWAN, using a wireless access technology such as CDMA, and another interface for communication with a WLAN, using a wireless access technology such as IEEE 802.11. Thus, a multi-mode mobile station could use a WLAN for wireless communication when the multi-mode mobile station is operating in certain locations, e.g., indoor locations, but may use a WWAN for wireless communication when the multi-mode mobile station is operating in other locations, e.g., outdoor locations. The fact that a multi-mode mobile station could be accessible via different networks at different times can cause challenges. In particular, when a call is placed to a directory number associated with a multi-mode mobile station, the question becomes how best to try to reach the multi-mode mobile station and notify it of the incoming call. For example, in existing systems, if the incoming call is sent to the WWAN but the multi-mode mobile station does not answer the call, the call may be sent to voicemail—even though the multi-mode mobile station may have failed to answer because it was in communication with the WLAN, rather than the WWAN.

Accordingly, there is a need to provide improved methods and systems for notifying multi-mode mobile stations of incoming calls.

SUMMARY

In a first principal aspect, an exemplary embodiment of the present invention provides a method of attempting to notify a multi-mode mobile station of a requested communication session. The multi-mode mobile station has a first interface for wireless communication with a first wireless network and a second interface for wireless communication with a second wireless network. In accordance with the method, a request to establish a communication session with the multi-mode mobile station is received. A first notification message is transmitted to try to reach the multi-mode mobile station via the first wireless network. The first notification message provides notification of the request to establish a communication session. If a predetermined response is not received from the multi-mode mobile station within a predetermined period of time, then a second notification message is transmitted to try to reach the multi-mode mobile station via the second wireless network. The second notification message provides notification of the request to establish a communication session.

In a second principal aspect, an exemplary embodiment of the present invention provides a method for attempting to communicate with a multi-mode mobile station. The multi-mode mobile station has a first interface for wireless communication with a first wireless network and a second interface for wireless communication with a second wireless network. In accordance with the method, a request to establish a communication session with the multi-mode mobile station is received from a requestor. In response to the request, a first-network attempt is made to establish a communication session with the multi-mode mobile station via the first wireless network. If the first-network attempt is unsuccessful because the multi-mode mobile station is found to be inaccessible via the first wireless network, a second-network attempt is made to establish a communication session with the multi-mode mobile station via the second wireless network.

In a third principal aspect, an exemplary embodiment of the present invention provides a system for communicating with a multi-mode mobile station. The multi-mode mobile station has a first interface for wireless communication with a first wireless network and a second interface for wireless communication with a second wireless network. The system comprises a controller that is communicatively coupled to the first wireless network and the second wireless network. In response to receiving a request to establish a communication session with the multi-mode mobile station, the controller makes a first-network attempt to establish the communication session with the multi-mode mobile station via the first wireless network. If the multi-mode mobile station is found to be inaccessible via the first wireless network, then the controller makes a second-network attempt to establish the communication session with the multi-mode mobile station via the second wireless network.

DETAILED DESCRIPTION OF EXEMPLARY EMBODIMENTS

1. Overview

Figure 1:
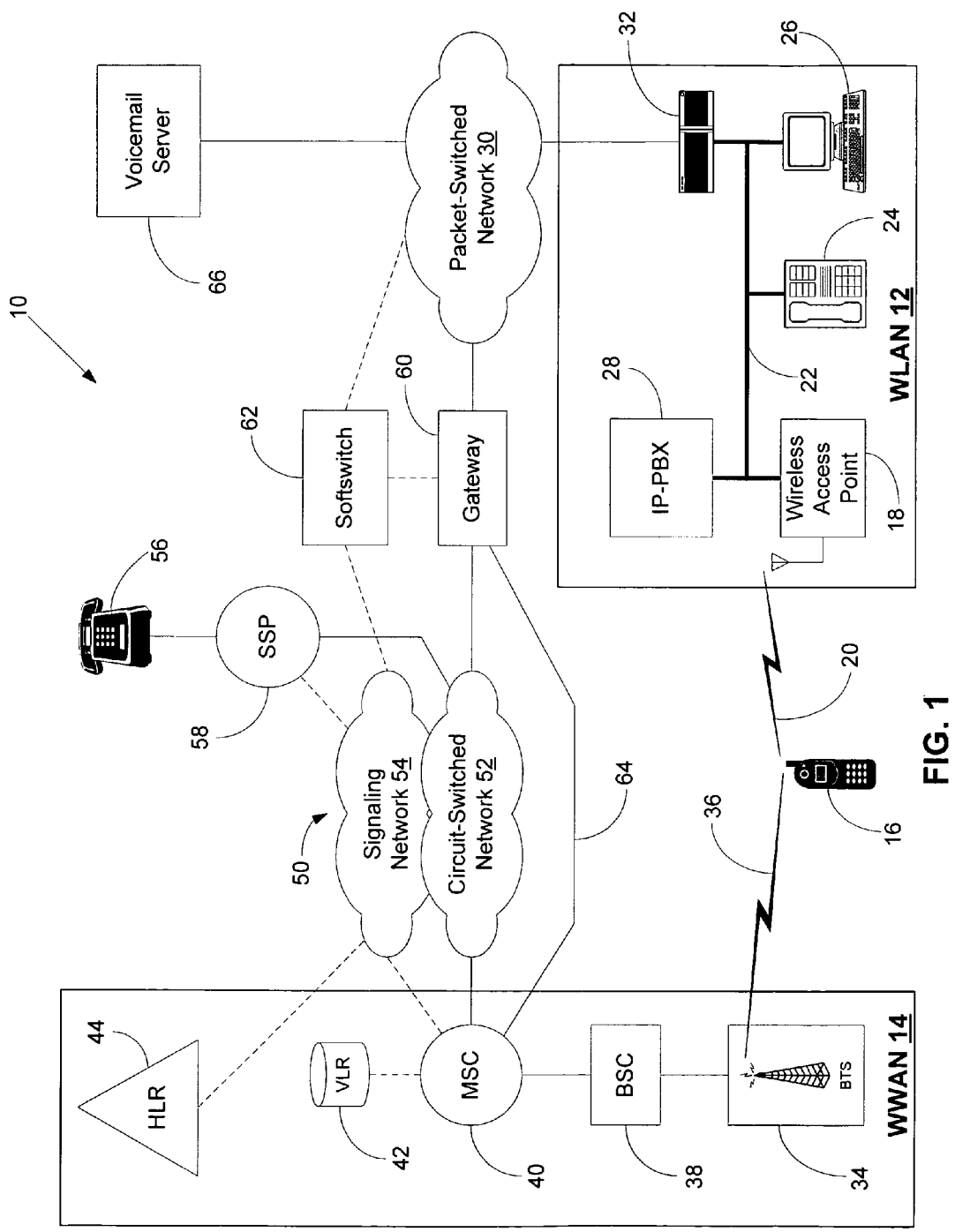
FIG. 1 is a simplified block diagram of a wireless telecommunications system, in accordance with an exemplary embodiment of the present invention.

The present invention provides, in exemplary embodiments, methods and systems for notifying multi-mode mobile stations of incoming calls. A multi-mode mobile station includes a plurality of interfaces for wireless communication with a plurality of different wireless networks. Such wireless networks may include wireless wide area networks (WWANs), e.g., using CDMA, or GSM, and wireless local area networks (WLANs), e.g., using 802.11x or Bluetooth. Thus, an exemplary multi-mode mobile station includes a first interface for wireless communication with a WLAN using 802.11x and a second interface for wireless communication with a WWAN using CDMA. In other embodiments, however, the multi-mode mobile station may have more than two interfaces and/or may communicate with wireless networks other than WWANs and WLANs.

The multi-mode mobile station may use different wireless networks at different times, for example, based on what wireless network is available and preferred in a given location. Thus, when the multi-mode mobile station is operating in a first location, the multi-mode mobile station may use its first interface and a first wireless network (e.g., a WLAN) for wireless communication. However, the multi-mode mobile station may then move to a second location and instead use its second interface and a second wireless network (e.g., a WWAN) for wireless communication.

In an exemplary embodiment, both the first and second interfaces of the multi-mode mobile station may be reachable using the same directory number (DN). Thus, when a caller dials this DN to call the multi-mode mobile station, the call may be established via either the first wireless network or the second wireless network, depending on which wireless network the multi-mode mobile station is using for wireless communication.

A softswitch or other controller may control the process of establishing calls or other communication sessions with the multi-mode mobile station. To perform this function, the controller may be associated with the multi-mode mobile station's DN. Thus, when a caller places a call to the multi-mode mobile station's DN, the signaling to set up the call is routed to the controller. In response to this signaling, the controller may first attempt to establish the call via the first wireless network. If that attempt is unsuccessful, because the multi-mode mobile station is found to be inaccessible via the first wireless network, the controller may then attempt to establish the call via the second wireless network.

To try to establish a call via the first wireless network, the controller may cause a first notification message for the multi-mode mobile station to be transmitted via the first wireless network. The first notification message provides notification of the incoming call. For example, if the first wireless network is a WLAN, the first notification message might be a Session Initiation Protocol (SIP) Invite message. If the multi-mode mobile station is accessible via the first wireless network, then the multi-mode mobile station may receive the first notification message and responsively provide a user-discernible indication of the incoming call. The user-discernible indication could include, for example, an audible indication, such as a ringing or other alert sound, a tactile indication, such as a vibration, and/or a visual indication, such as text or graphics on the multi-mode mobile station's display screen. If the user answers the call, the multi-mode mobile station may transmit a message indicating that the multi-mode mobile station has accepted the call, e.g., a SIP 200 OK message. If the user does not answer the call, the controller may establish the call to a voicemail system.

However, if the multi-mode mobile station is found not to be accessible via the first wireless network, the controller may then try to establish the call via the second wireless network. To do this, the controller may cause a second notification message for the multi-mode mobile station to be transmitted via the second wireless network. The second notification message provides notification of the incoming call. For example, if the second wireless network is a WWAN, the second notification message might be an alert message transmitted to the multi-mode mobile station after first paging the multi-mode mobile station. If the multi-mode mobile station is accessible via the second wireless network, then the multi-mode mobile station may receive the second notification message and responsively provide a user-discernible indication of the incoming call. If the user answers the call, the multi-mode mobile station may transmit a connect message indicating that the multi-mode mobile station has accepted the call. If the user does not answer the call, the controller may establish the call to a voicemail system.

2. Exemplary Network Architecture

FIG. 1 is a simplified block diagram of an exemplary wireless telecommunications system 10. In FIG. 1, connections that carry voice or other media are shown as solid lines and connections that carry primarily signaling are shown as dashed lines.

Wireless telecommunications system 10 includes network elements that function together as a wireless local area network (WLAN) 12 and network elements that function together as a wireless wide area network (WWAN) 14. WLAN 12 may provide wireless coverage in a relatively limited area, such as in a building or part of a building. In addition, WLAN 12 may use one or more unlicensed frequency bands, such as the unlicensed frequency band in the 2.4 GHz range. For example, WLAN 12 may use IEEE 802.11a, IEEE 802.11b, IEEE 802.11e, IEEE 802.11g, or IEEE 802.11h (wherein these and other members of the IEEE 802.11 family of specifications are referred to generically herein as "802.11x"), or variations thereof, for wireless communication. These 802.11x standards are incorporated herein by reference. Alternatively or additionally, WLAN 12 may use IEEE 802.16, Bluetooth, HomeRF, HiperLAN, a Multi-channel Multipoint Distribution Service (MMDS), or some other wireless protocol or format for wireless communication.

WWAN 14 may provide wireless coverage in a relatively large geographic area, such as an entire city, often by using a plurality of contiguous wireless coverage areas, such as cells or sectors. The wireless communication in WWAN 14 may occur in an analog format, such as the Advanced Mobile Phone Service (AMPS), or in a digital format, such as code division multiple access (CDMA), time division multiple access (TDMA), or Global System for Mobile communication (GSM), and it may occur in licensed frequency bands, such as the 1.9 GHz PCS bands.

A multi-mode mobile station 16 has a first interface for wireless communication with WLAN 12 and a second interface for wireless communication with WWAN 14. More particularly, multi-mode mobile station 16 is able to communicate with WLAN 12 when operating in an area served by WLAN 12 and is able to communicate with WWAN 14 when operating in an area served by WWAN 14. In some areas, the wireless coverage of WLAN 12 and WWAN 14 may be overlapping, and multi-mode mobile station 16 may use an arbitration method to determine whether to communicate with WLAN 12 or with WWAN 14. Multi-mode mobile station 16 may be a wireless telephone, wirelessly-equipped personal digital assistants (PDA), wirelessly-equipped laptop computer, or other type of wireless communication device.

WLAN 12 includes at least one wireless access point 18. Wireless access point 18 provides a wireless coverage area within which wireless access point 18 is able to communicate with wireless communication devices, such as multi-mode mobile station 16, over an air interface 20. Wireless access point 18 may be communicatively coupled to other network elements, e.g., via a local area network (LAN) 22. LAN 22 may carry voice, data, and/or other media in a packet-based format. Thus, LAN 22 may be connected to other communication devices that exchange voice in a packet-based format. For example, LAN 22 may be connected to a voice-over-packet (VoP) telephone 24, a personal computer 26 equipped for audio communication, e.g., equipped with a microphone and speaker, and/or one or more other wireless access points. LAN 22 may also be connected to an IP-PBX 28 or other system that controls VoP communications within WLAN 12.

LAN 22 may be communicatively coupled to a wide area packet-switched network 30, via a network access device 32. Network access device 32 may be a cable modem, DSL modem, or router, for example. Packet-switched network 30 may route packets using a network protocol, such as the Internet Protocol (IP), in combination with the User Datagram Protocol (UDP) or Transmission Control Protocol (TCP). The IP packets may be carried over lower level protocols, such as asynchronous transfer mode (ATM) protocols. Protocols, such as the Real-Time Transport Protocol (RTP), may be used to carry voice or other media through packet-switched network 30 in a real-time format. Relevant aspects of RTP are described in Schulzrinne, et al., "RTP: A Transport Protocol for Real-Time Applications," Request for Comments 1889 (January 1996), which is incorporated herein by reference.

Other protocols, such as the Session Initiation Protocol (SIP), may be used to set up and/or manage communication sessions through packet-switched network 30. Voice, data, and/or other media may be exchanged in such communication sessions. Relevant aspects of SIP are described in Rosenberg, et al., "SIP: Session Initiation Protocol," Request for Comments 3261 (June 2002), which is incorporated herein by reference. SIP and/or other protocols may, in turn, use the Session Description Protocol (SDP) to describe the communication sessions that are being set up or managed. Relevant aspects of SDP are described in M. Handley, et al., "SDP: Session Description Protocol," Request for Comments 2327 (April 1998), which is incorporated herein by reference.

In an exemplary embodiment, SIP is used to set up communication sessions through packet-switched network 30 that involve WLAN 12. WLAN 12 may include one or more SIP user agents for this SIP signaling. For example, IP-PBX 28 may include a SIP user agent to engage in SIP signaling on behalf of multi-mode mobile station 16 or other communication devices communicatively coupled to WLAN 12. Alternatively, multi-mode mobile station 16 may have its own SIP user agent.

WWAN 14 may include a base transceiver station (BTS) 34 that provides a wireless coverage area within which BTS 34 may communicate with one or more mobile stations, such as multi-mode mobile station 16, over an air interface 36. Although FIG. 1 shows only one BTS, WWAN 14 may include a plurality of BTSs that may provide a plurality of wireless coverage areas. The communications between BTS 34 and multi-mode mobile station 16 may occur in a digital format, such as CDMA, TDMA, GSM, or they may occur in an analog format, such as AMPS. The communications could be voice only, data only (e.g., using EV-DO), or may include a combination of voice and data (e.g., using EV-DV). A preferred wireless communications format is cdma2000 such as described in EIA/TIA/IS-2000 Series, Rev. A (published March 2000), which is incorporated herein by reference.

BTS 34 may be controlled by a base station controller (BSC) 38, which, in turn, may be controlled by a mobile switching center (MSC) 40. Although FIG. 1 shows only one MSC and only one BSC, WWAN 14 may include a plurality of MSCs, which may, in turn, control a plurality of BTSs, via a plurality of BSCs. MSC 40 also has access to a visitor location register (VLR) 42. VLR 42 stores data records for mobile stations, such as multi-mode mobile station 16, that are being served by MSC 40. A data record stored in VLR 42 for a mobile station may identify the mobile station, e.g., by mobile directory number (MDN), mobile station identification (MSID), and/or electronic serial number (ESN). The data record may also include status information for the mobile station, such as whether the mobile station is busy, and may also include a service profile that identifies the services to which the mobile station subscribes. The data record may also include other information relating to the mobile station. Although FIG. 1 shows VLR 42 as a network element separate from MSC 40, VLR 42 may be integrated or co-located with MSC 40.

WWAN 14 may also include a home location register (HLR) 44 that stores a data record for multi-mode mobile station 16. The data record stored in HLR 44 for multi-mode mobile station 16 may identify multi-mode mobile station 16, such as by MDN, MSID, and/or ESN and may include a last known location of multi-mode mobile station 16. For example, the data record may identify the VLR that most recently registered multi-mode mobile station 16 with HLR 44. The data record may also include status information for multi-mode mobile station 16, a service profile for multi-mode mobile station 16, and other information relating to multi-mode mobile station 16.

MSC 40 is connected to the public switched telephone network (PSTN) 50. PSTN 50 may use an out-of-band signaling system, such as Signaling System 7 (SS7) to route calls. Thus, PSTN 50 may include a circuit-switched network 52 that carries bearer traffic, i.e., the voice or other media in calls, and a signaling network 54 that carries signaling traffic used to set up, tear down, monitor, and control calls. Circuit-switched network 52 may include a plurality of trunks, with each trunk carrying media in a time division multiplex (TDM) format. Signaling system 54 may include a plurality of networked signal transfer points (STPs).

PSTN 50 may also be connected to various landline telephony endpoints, exemplified in FIG. 1 by landline telephone 56. More particularly, landline telephone 56 may be connected to a switching system, such as service switching point (SSP) 58, which, in turn, may have a bearer connection to circuit-switched network 52 and a signaling connection to signaling network 54.

MSC 40 may communicate with signaling network 54, e.g., using SS7, to route calls via circuit-switched network 52 to and from mobile stations being served by WWAN 14, such as multi-mode mobile station 16. To provide telecommunications services to mobile stations being served by WWAN 14, such as multi-mode mobile station 16, MSC 40 may also communicate with HLR 44 via signaling network 54. The communications between MSC 40 and HLR 44 may conform to IS-41 specifications. A recent revision of the IS-41 specifications, ANSI/TIA/EIA-41-D-97, published in December 1997, is incorporated herein by reference. The IS-41 signaling may be carried in signaling network 54 as an SS7 application layer.

Packet-switched network 30 may be communicatively coupled to circuit-switched network 52, via a gateway 60, and may be communicatively coupled to signaling network 54, via a softswitch 62. Gateway 60 may function as a media gateway, converting between media formats used in circuit-switched network 52 and packet-switched network 30. For example, gateway 60 may receive media from circuit-switched network 52 in a TDM format and convert the media into an RTP format for transmission over packet-switched network 50, and vice-versa. Gateway 60 may also be connected to, or integrated with, MSCs, such as MSC 40. Thus, MSC 40 may have a bearer connection with gateway 60 via an intermachine trunk 64.

Softswitch 62 may control gateway 60 via a signaling link, e.g., using the Media Gateway Control Protocol (MGCP). Relevant aspects of MGCP are described in F. Andreason, et al., "Media Gateway Control Protocol (MGCP) Version 1.0," Request for Comments 3435 (January 2003), which is incorporated herein by reference. More particularly, softswitch 62 may control gateway 60 to link up calls carried by PSTN 50 with communication sessions carried by packet-switched network. Thus, softswitch 62 may engage in SS7 or other signaling to route calls to and from gateway 60 through PSTN 50, and softswitch 62 may use SIP and/or other protocols to establish communication sessions through packet-switched network 30 between gateway 60 and various endpoints, e.g., multi-mode mobile station 16 when it is accessible via WLAN 12.

More particularly, softswitch 62 may serve as a controller with respect to calls placed to multi-mode mobile station, such as multi-mode mobile station 16. To do this, softswitch 62 may be associated with the directory numbers associated with these multi-mode mobile stations. In particular, when a call is placed to the directory number of multi-mode mobile station 16, softswitch 62 receives the signaling for the incoming call. The call could be placed by an endpoint coupled to PSTN 50, such as landline telephone 56, in which case softswitch 62 may receive SS7 signaling for the incoming call. The call could also be placed by an endpoint coupled to packet-switched network 30, in which case softswitch 62 may receive a SIP Invite message for the incoming call. Either way, softswitch 62 may attempt to terminate the call to multi-mode mobile station 16 in accordance with an exemplary embodiment, as described in more detail below.

Softswitch 62 may also have access to various types of information regarding multi-mode mobile stations, such as multi-mode mobile station 16. For example, softswitch 62 may serve as a SIP registrar, in which case softswitch 62 may maintain a database of SIP registrations for multi-mode mobile stations. A SIP registration for a multi-mode mobile station may associate a SIP URI with one or more contact addresses that can be used to reach the multi-mode mode mobile station, provided the multi-mode mobile station is in communication with the appropriate wireless network. For example, when a multi-mode mobile station first associates with a given wireless access point in a WLAN, e.g., wireless access point 18 in WLAN 12, the multi-mode mobile station may use the SIP REGISTER method to register a contact address with the SIP registrar. The contact address can be used to reach the multi-mode mobile station via the WLAN, at least at the time of the registration. However, when the multi-mode mobile station moves outside of the coverage area of the WLAN, the multi-mode mobile station may no longer be reachable using that contact address. Moreover, the multi-mode mobile station may not necessarily cancel or update its registration when it moves out of the coverage area of the WLAN. Thus, the contact address in a SIP registration may not necessarily be current, but, rather, may serve as a multi-mode mobile station's last known address.

In this way, softswitch 62 may maintain registrations that contain the last known addresses to reach multi-mobile stations via WLAN 12. In some cases, however, a different network element may function as the SIP registrar for WLAN 12. Thus, softswitch 62 may query one or more other network elements, e.g., a SIP registration or location service, to find the last known address of a multi-mode mobile station.

In addition to SIP registrations, softswitch 62 may have access to other data records regarding multi-mode mobile stations. For example, softswitch 62 may have access to service profiles regarding the services that multi-mode mobile stations have subscribed to. Softswitch 62 may maintain such service profiles or may obtain them from another network element, such as HLR 44.

Wireless telecommunications network 10 may also include a voicemail server 66 for storing voicemail messages for multi-mode mobile stations, such as multi-mode mobile station 16. In an exemplary embodiment, voicemail server 66 is coupled to packet-switched network 30, as shown in FIG. 1. Alternatively, voicemail server 66 could be coupled to PSTN 50, coupled to MSC 40, or be otherwise located in network 10. As described in more detail below, softswitch 62 may establish a call to voicemail server 66 when the multi-mode mobile station intended to receive the call does not answer it.

3. Exemplary Operation

Figure 2:
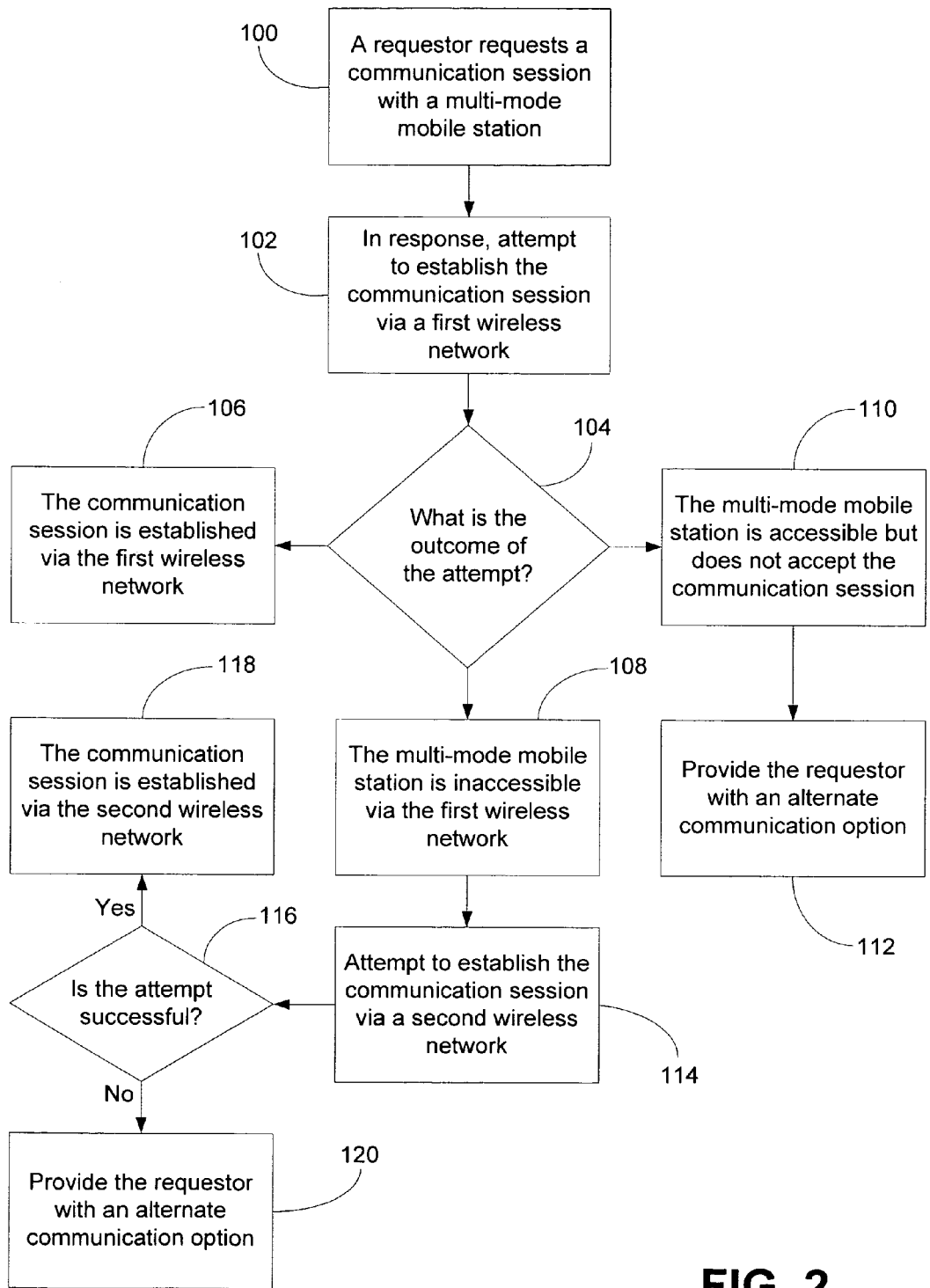
FIG. 2 is a flow chart illustrating a method of attempting to communicate with a multi-mode mobile station, in accordance with an exemplary embodiment of the present invention.

FIG. 2 is a flow chart illustrating a process for attempting to communicate with a multi-mode mobile station, in accordance with an exemplary embodiment. The process of FIG. 2 may make use of wireless telecommunications system 10 and multi-mode mobile station 16, as shown in FIG. 1. It is to be understood, however, that other network architectures could be used to implement to the process of FIG. 2.

The process may begin when a requestor requests the establishment of a communication session with a multi-mode mobile station, as indicated by block 100. The requested communication session could be, for example, a voice call. Alternatively, the requested communication session could involve the exchange of data only, or it may involve the exchange of a combination of voice, data, video, and/or other media. The requester might make this request via a communication device that is to be involved in the requested communication session. The communication device could be, for example, a landline device that communicates via PSTN 50 (e.g., landline telephone 56) or via packet-switched network 30, or a wireless device that communicates via WWAN 14 or WLAN 12. The request may be embodied in signaling, such as SS7 signaling (e.g., if the requestor communicates via PSTN 50) or SIP signaling (e.g., if the requestor communicates via packet-switched network 30). The request might identify the multi-mode mobile station in different ways. For example, the request might identify the multi-mode mobile station by a directory number (DN) that is associated with the multi-mode mobile station.

In response to this request, an attempt is made to establish the communication session with the multi-mode mobile station via a first wireless network, as indicated by block 102. In an exemplary embodiment, the first wireless network is a wireless local area network, such as WLAN 12 in FIG. 1. As described in more detail below, the process of attempting to establish the communication session may involve transmitting, via the first wireless network, one or more messages intended for the multi-mode mobile station and waiting to receive one or more predetermined responses from the multi-mode mobile station within one or more predetermined periods of time. The one or more messages may provide notification of the request to establish a communication session. The one or more predetermined responses may indicate whether the multi-mode mobile station is accessible via the first wireless network and, if so, whether the multi-mode mobile station accepts the communication session. In particular, if the multi-mode mobile station receives the one or more messages, it may responsively provide a user-discernible indication of the request. The user-discernible indication could include, for example, an auditory indication, such as a ringtone or other alert sound, a tactile indication, such as a vibration, and/or a visual indication, such as text or graphics on the multi-mode mobile station's display screen. A user of the multi-mode mobile station may then decide whether to accept the requested communication session.

The attempt to establish a communication session via the first wireless network could result in a number of possible outcomes, as indicated by block 104. One possible outcome is that the communication session is successfully established via the first wireless network, as indicated by block 106. In that case, the requestor and the multi-mode mobile station may then be able to exchange voice, data, and/or other media, via the first wireless network. It is to be understood that, although the communication session may be initially established via the first wireless network, the multi-mode mobile station may move out of the coverage area of the first wireless network during the course of the communication session, in which case the communication session may be continued via a different wireless network, if available, or may be dropped.

Another possible outcome is that the attempt is unsuccessful because the multi-mode mobile station is found to be inaccessible via the first wireless network, as indicated by block 108. The multi-mode mobile station may be inaccessible via the first wireless network for various reasons. For example, the multi-mode mobile station might not be operating in an area served by the first wireless network. As another example, the multi-mode mobile station might be operating in an area served by the first wireless network but may not have registered with the first wireless network. Various approaches could be used to determine that the multi-mode mobile station is inaccessible via the first wireless network. In an exemplary embodiment that is described in more detail below, the multi-mode mobile station is found to be inaccessible when it does not respond within a predetermined period of time to a message that provides notification of the request to establish a communication session.

Yet another possible outcome is that the attempt is unsuccessful because the multi-mode mobile station is found to be accessible via the first wireless network but does not accept the communication session, as indicated by block 110. This may occur, for example, when the multi-mode mobile station responds in some fashion to one or more message transmitted for it via the first wireless network, thereby indicating that the multi-mode mobile station is accessible via the first wireless network, but does not respond with a message indicating acceptance of the communication session. The multi-mode mobile station may fail to accept the requested communication session for various reasons. For example, the multi-mode mobile station may already be fully engaged in one or more communication sessions such that it is not able to accept the requested communication session. Alternatively, the user of the multi-mode mobile station user may simply decide not to accept the communication session.

If the multi-mode mobile station is accessible via the first wireless network but does not accept the communication session, then the requester may be provided with an alternate communication option, as indicated by block 112. The alternate communication option could, for example, allow the requestor to leave a voice message on a voicemail system, e.g., voicemail server 66, or to send a text message to the multi-mobile station, e.g., as an instant message or short message service (SMS) message. Other types of alternate communication options could also be provided to the requester.

If, as in block 108, the multi-mode mobile station is found to be inaccessible via the first wireless network, an attempt may be made to establish the communication session via the second wireless network, as indicated by block 114. If the first wireless network is a WLAN, e.g., WLAN 12, then the second wireless network could be a WWAN, such as WWAN 14.

As described in more detail below, the second attempt to establish the requested communication session may involve transmitting, via the second wireless network, one or more messages intended for the multi-mode mobile station and waiting to receive one or more predetermined responses from the multi-mode mobile station within one or more predetermined periods of time. The responses may indicate whether the second attempt is successful, i.e., whether the multi-mode mobile station is accessible via the second wireless network and accepts the communication session. In particular, the one or more messages may provide notification of the request to establish a communication session. Thus, if the multi-mode mobile station is accessible via the second wireless network, the multi-mode mobile station may responsively provide a ringtone or other user-discernible indication of the request. A user of the multi-mode mobile station may then decide whether to accept the requested communication session. If the user accepts the communication session, the multi-mode mobile station may indicate that acceptance by transmitting a connect message.

How the process continues depends on whether the second attempt may be classified as either successful or unsuccessful, as indicated by block 116. If successful, the communication session is established via the second wireless network, as indicated by block 118. In that case, the requestor and multi-mode mobile station may exchange voice, data, or other media via the second wireless network. However, during the communication session, the multi-mode mode mobile station may move out of the coverage area of the second wireless network such that the communication session is either dropped or continued over another wireless network.

If the outcome of the second attempt is unsuccessful, either because the multi-mode mobile station is inaccessible via the second wireless network or is accessible but does not accept the communication session, then the requestor may be provided with an alternate communication option, as indicated by block 120. The alternate communication option could, for example, allow the requestor to leave a voice message on a voicemail system, e.g., voicemail server 66, or to send a text message to the multi-mobile station, e.g., as an instant message or SMS message. Other types of alternate communication options could also be provided.

Figure 3:
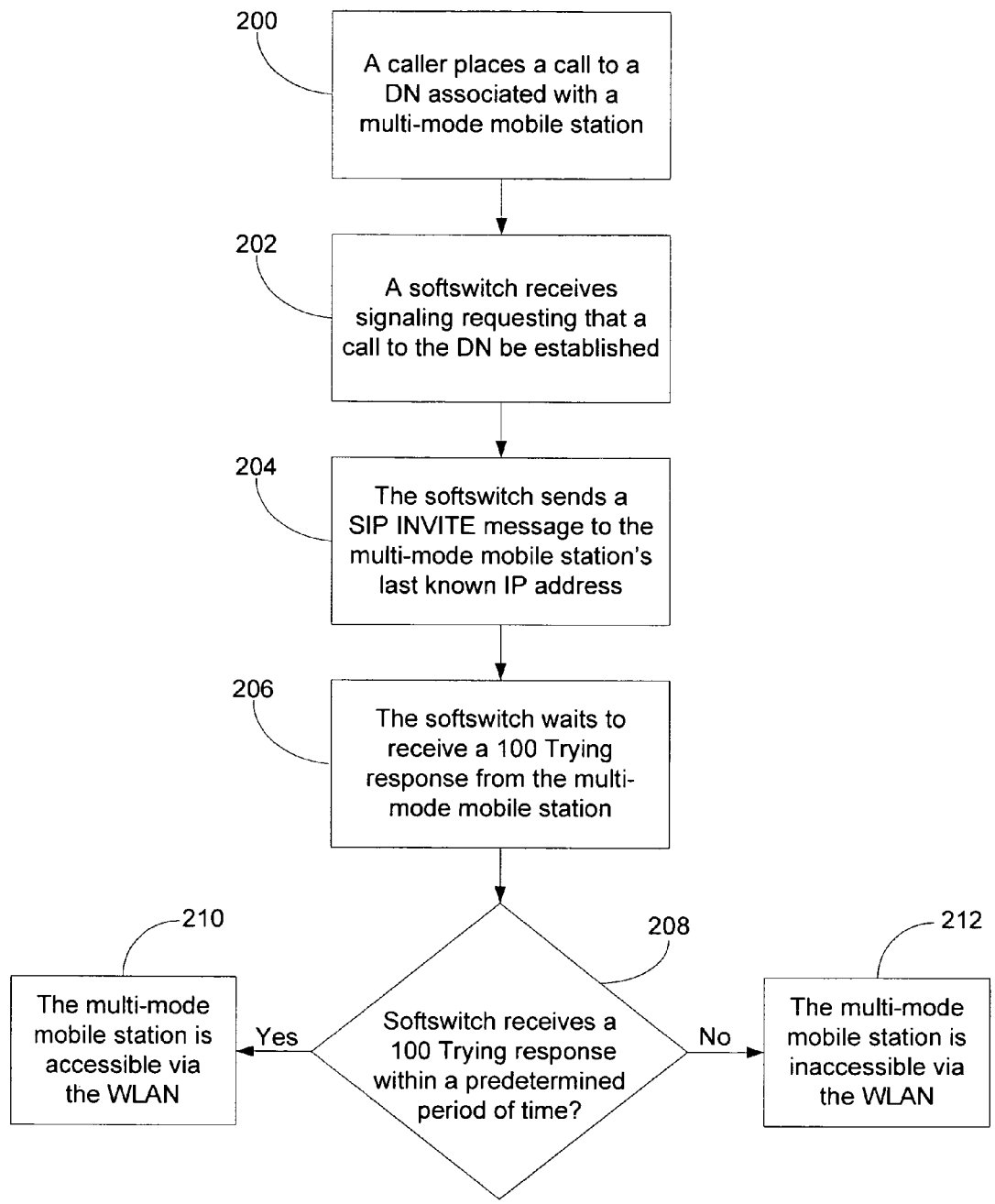
FIG. 3 is a flow chart illustrating a method of trying to reach a multi-mode mobile station via a wireless local area network (WLAN), in accordance with an exemplary embodiment of the present invention.
Figure 4:
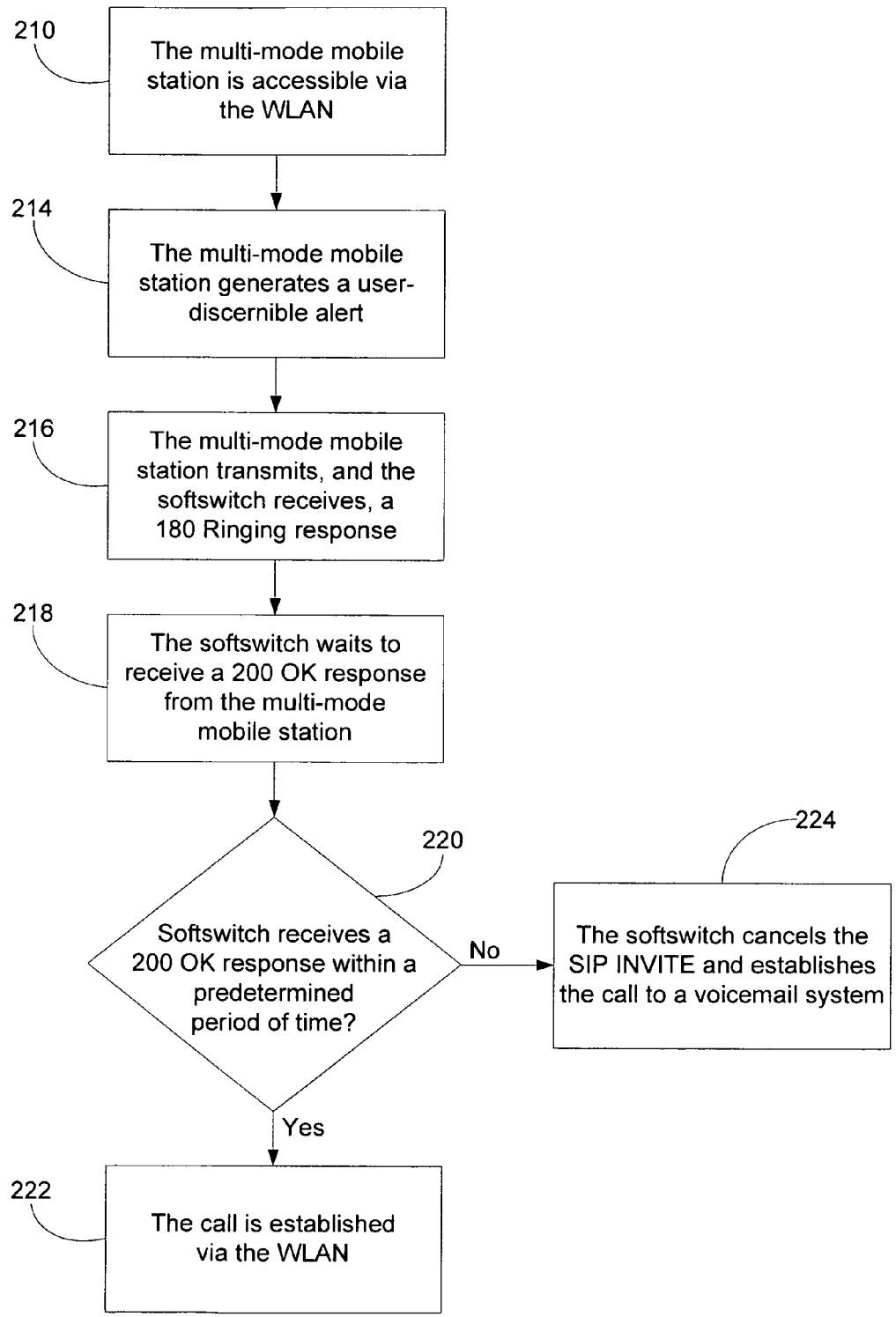
FIG. 4 is a flow chart illustrating a method, which follows the method of FIG. 3, of trying to establish a communication session with the multi-mode mobile station via the WLAN, in accordance with an exemplary embodiment of the present invention.
Figure 5:
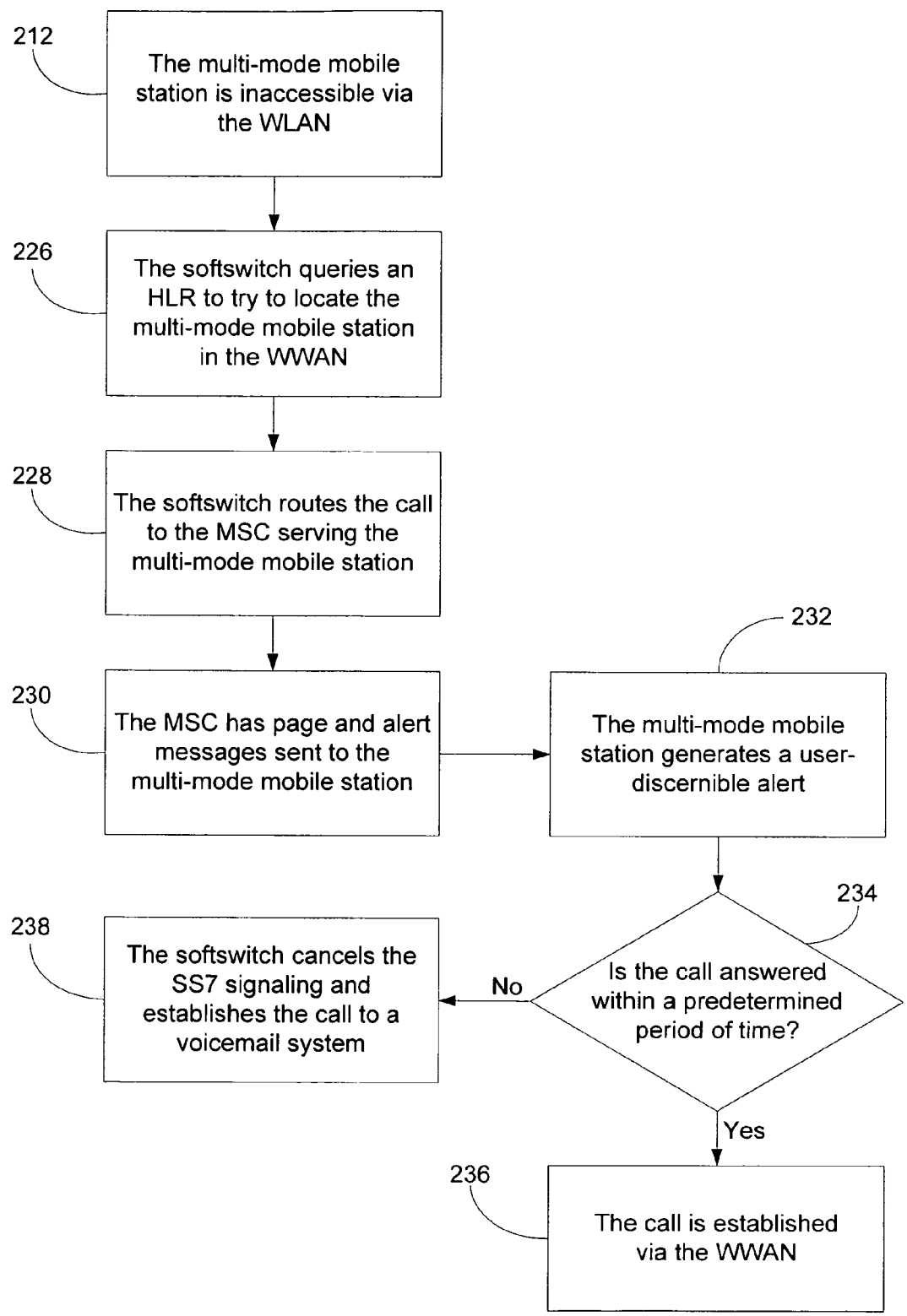
FIG. 5 is a flow chart illustrating a method, which follows the method of FIG. 3, of trying to establish a communication session with the multi-mode mobile station via a wireless wide area network (WWAN), in accordance with an exemplary embodiment of the present invention.

FIGS. 3 through 5 illustrate an exemplary process for a case in which (i) the requested communication is a voice call, (ii) the first wireless network is a WLAN, e.g., WLAN 12, and (iii) the second wireless network is a WWAN, such as WWAN 14. Moreover, the network architecture for this exemplary process is shown in FIG. 1. Thus, softswitch 62 controls the process of trying to establish the call to multi-mode mobile station 16. The signaling in this example uses SIP, SS7, and IS-41, for purposes of illustration. However, it is to be understood that other signaling protocols could be used.

With reference to FIG. 3, the process may begin when a caller places a call to a directory number (DN) associated with multi-mode mobile station 16, as indicated by block 200. In general, the caller could be using either a landline or wireless communication device, which could be coupled to the PSTN or to a packet-switched network. However, for purposes of illustration, the caller will be assumed to be using landline telephone 56. Thus, signaling network 54 will route the call, e.g., using SS7 signaling, based on the dialed DN. In this case, the DN is registered with softswitch 62, e.g., by setting up routing tables in signaling network 54 so that the DN corresponds to the point code of softswitch 62. Thus, softswitch 62 receives the SS7 signaling that is generated to set up the call to the DN, as indicated by block 202.

In response, softswitch 62 attempts to establish the call to multi-mode mobile station 16 via WLAN 12. To do this, softswitch 62 sends a SIP INVITE message to the last known address, e.g., last known IP address, of multi-mode mobile station 16, as indicated by block 204. The SIP INVITE message may identify the calling party, e.g., by the directory number of landline telephone 56 and may identify multi-mode mobile station 16 as the called party, e.g., by its DN. Thus, the SP INVITE message provides notification of the request to establish the call to multi-mode mobile station 16.

Softswitch 62 may determine the last known address of multi-mode mobile station 16 by consulting an internal database, e.g., if softswitch 62 is the SIP registrar for multi-mode mobile station 16, or an external database, e.g., if another network serves as the SIP registrar. In particular, the last known address may correspond to the last address that multi-mode mobile station 16 registered with the SIP registrar, e.g., using a SIP REGISTER message, when multi-mode mobile station 16 was in communication with WLAN 12. Thus, the last known address would route the SIP INVITE message to multi-mode mobile station 16, via WLAN 12 and packet-switched network 30, provided that multi-mode mobile station 16 is still in communication with WLAN 12. However, since its last SIP registration, multi-mode mode mobile station 16 may have moved outside of the coverage area of WLAN 12 or may have been powered off without canceling its registration with the SIP registrar. Thus, the fact that a last known address for multi-mode mobile station 16 is available does not mean that multi-mode mobile station 16 is actually accessible via WLAN 12. As a result, the SIP INVITE transmitted by softswitch 62 may or may not reach multi-mode mobile station 16, depending on whether multi-mode mobile station is still accessible via WLAN 12.

To determine whether multi-mode mobile station 16 is accessible via WLAN 12, softswitch 62 waits to receive from multi-mode mobile station 16 an appropriate response to the SIP INVITE message, e.g., a 100 Trying message, as indicated by block 206. How the process continues depends on whether softswitch 62 receives a 100 Trying message from multi-mode mobile station 16 within a predetermined period of time, as indicated by block 208. The predetermined period of time might be measured using a timer that was started when softswitch 62 sent the SIP INVITE message, or the predetermined period of time might be measured in some other fashion. It is to be understood that, softswitch 62 may not necessarily wait for the entire period of time to receive a 100 Trying message. For example, softswitch 62 may receive a failure message indicating that there is no need to continue waiting for a 100 Trying message.

If softswitch 62 receives a 100 Trying message from multi-mode mobile station 16 within the predetermined period of time, then multi-mode mobile station 16 is found to be accessible via WLAN 12, as indicated by block 210. If, however, softswitch 62 does not receive a 100 Trying message from multi-mode mobile station 16 within the predetermined period of time, then multi-mode mobile station is found to be inaccessible via WLAN 12, as indicated by block 212.

FIG. 4 illustrates the continuation of the process of FIG. 3, for the case that multi-mode mobile station is accessible via WLAN 12, as indicated by block 210. In particular, in response to the SIP INVITE message, which provides notification of the incoming call, multi-mode mobile station 16 generate a user-discernible alert, such as a ringtone, a vibration, and/or a textual or graphical indication, as indicated by block 214. In this way, the user is alerted of the incoming call. Multi-mode mobile station 16 may also continue to respond to the SIP INVITE by transmitting a 180 Ringing message, which softswitch 62 then receives, as indicated by block 216. The 180 Ringing message indicates that multi-mode mobile station 16 is alerting the user of the incoming call.

If the user answers, then multi-mode mobile station 16 may transmit an acceptance message, such as a 200 OK message in response to the SIP INVITE message, to indicate that the call is accepted. Thus, softswitch 62 may wait to receive a 200 OK response from multi-mode mobile station 16, as indicated by block 218. How the process continues depends on whether softswitch 16 receives a 200 OK response from the multi-mode mobile station 16 within a predetermined period of time, as indicated by block 220. The predetermined period of time could be measured using a timer that was started when softswitch 62 receives the 180 Ringing response, or the predetermined period of time could be measured in other ways. It is to be understood that, softswitch 62 may not necessarily wait for the entire period of time to receive a 200 OK message. For example, softswitch 62 may receive a failure or other message indicating that the user has not accepted, or is unable to accept, the call.

If softswitch 62 receives a 200 OK response from multi-mode mobile station 16 within the predetermined period of time, then the call is established via WLAN 12, as indicated by block 222. Landline telephone 56 and multi-mode mobile station 16 may then exchange media during the call via circuit-switched network 52, gateway 60, packet-switched network 30, WLAN 12, and air interface 20. In circuit-switched network 52, the media may be conveyed in a TDM format. However, in packet-switched network 30, in WLAN 12, and over air interface 20, the media may be conveyed in a real-time packet format. Gateway 60 may convert between the TDM format and the real-time packet format.

If softswitch 62 does not receive a 200 OK response within the predetermined period of time, then multi-mode mobile station 16 is unavailable for the call, even though it is accessible via WLAN 12. Multi-mode mobile station 16 could be unavailable because it is busy or because the user chose not to answer the call. If multi-mode mobile station 16 is unavailable for the call, then softswitch 62 may cancel the SIP INVITE, e.g., by transmitting a SIP CANCEL message to multi-mode mobile station 16, and may establish the call to a voicemail system, as indicated by block 224. For example, softswitch 62 may route the call to voicemail server 66, via gateway 60 and packet-switched network 30. The caller may then leave a voice message for the user of multi-mode mobile station 16. The caller may also be given other options instead of or in addition to leaving a voice message. For example, the caller may be given the option of sending an instant message or an SMS message to multi-mode mobile station 16.

FIG. 5 illustrates the continuation of the process of FIG. 3, for the case that multi-mode mobile station 16 is inaccessible via WLAN 12, as indicated by block 212. Having found that multi-mode mobile 16 is not accessible by WLAN 12, softswitch 62 may try to locate multi-mode mobile station 16 in WWAN 14 by querying HLR 44, as indicated by block 226. Softswitch 62 may also cancel the SIP INVITE, e.g., by transmitting a SIP CANCEL message to the last known address of multi-mode mobile station 16.

In an exemplary embodiment, softswitch 62 uses IS-41 signaling to query HLR 44 to try to locate multi-mode mobile station 16. For example, softswitch 62 may send an IS-41 LOCREQ message to HLR 44, e.g., identifying multi-mode mobile station 16 by its MDN and/or MSID. In response, HLR 44 may check its data record for multi-mode mobile station 16 to determine which system is currently serving multi-mode mobile station 16. For example, HLR 44 may find that MSC 40 is currently serving multi-mode mobile station 16. HLR 44 would then send an IS-41 ROUTEREQ message to MSC 40 to obtain a temporary local directory number (TLDN) that can be used to route the call to multi-mode mobile station 16. MSC 40 may respond with an IS-41 routereq_rr message that includes a TLDN, and HLR 44 may forward the TLDN to softswitch 62 in an IS-41 locreq_rr message. Softswitch 62 then routes the call to MSC 40, i.e., the MSC serving multi-mode mobile station 16, as indicated by block 228. To do this, softswitch 62 may send an SS7 Initial Address Message (IAM) with the TLDN obtained from HLR 44 as the called number.

When MSC 40 receives the signaling for the call, i.e., the IAM message, MSC 40 may have page and alert messages sent to multi-mode mobile station 16, e.g., via BTS 34, as indicated by block 230. In this way, multi-mode mobile station 16 is notified of the incoming call. Moreover, in response to the alert message, multi-mode mobile station 16 may generate a ringtone, vibration, a textual or graphical display, and/or other type of user-discernible alert, as indicated by step 232. If the user answers the call, then multi-mode mobile station 16 may transmit a connect message over air interface 36, and MSC 40 may responsively transmit an SS7 Address Complete Message (ACM) to softswitch 62.

How the process continues depends on whether the call is answered within a predetermined period of time, as indicated by step 234. In an exemplary embodiment, softswitch 62 makes this determination based on whether softswitch 62 receives an ACM message from MSC 40 within a predetermined period of time after sending the IAM message.

If the call is answered within the predetermined period of time, then the call is established via WWAN 14, as indicated by block 236. Landline telephone 56 and multi-mode mobile station 16 may then exchange media during the call via circuit-switched network 52, WWAN 14, and air interface 36.

If the call is not answered within the predetermined period of time, then softswitch 62 may cancel the SS7 signaling for routing the call to MSC 40, e.g., by sending an SS7 Cancel message to MSC 40, and may establish the call to a voicemail system, as indicated by block 238. To establish the call to voicemail, softswitch 62 may route the call to voicemail server 66, via gateway 60 and packet-switched network 30. The caller may then leave a voice message and may also be provided with other options, e.g., sending an instant message or SMS message to multi-mode mobile station 16.

4. CONCLUSION

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of attempting to notify a multi-mode mobile station of a requested communication session, said multi-mode mobile station having a first interface for wireless communication with a first wireless network and a second interface for wireless communication with a second wireless network, said method comprising:

receiving a request from a requester to establish a communication session with said multi-mode mobile station;

transmitting a first notification message to try to reach said multi-mode mobile station via said first wireless network, said first notification message providing notification of said request;

waiting to receive a predetermined response from said multi-mode mobile station;

if said predetermined response is not received within a predetermined period of time, transmitting a second notification message to try to reach said multi-mode mobile station via said second wireless network, said second notification message providing notification of said requests and if said predetermined response is received within said predetermined period of time but said multi-mode mobile station does not accept said communication session, providing said requestor with at least one alternate communication option.

2. The method of claim 1, wherein said first wireless network is a wireless local area network (WLAN).

3. The method of claim 2, wherein said second wireless network is a wireless wide area network (WWAN).

4. The method of claim 3, wherein said communication session is a voice call.

5. The method of claim 4, wherein said first notification message is a Session Initiation Protocol (SIP) Invite message.

6. The method of claim 5, wherein said predetermined response is a SIP 100 Trying message.

7. The method of claim 4, wherein said second notification message is an alert message.

8. A method for attempting to communicate with a multi-mode mobile station, said multi-mode mobile station having a first interface for wireless communication via a first a first wireless network and a second interface for wireless communication via a second wireless network, said method comprising:

receiving a request from a requester to establish a communication session with said multi-mode mobile station;

in response to said request, making a first-network attempt to establish said communication session with said multi-mode mobile station via said first wireless network;

if said first-network attempt is unsuccessful because said multi-mode mobile station is found to be inaccessible via said first wireless network, making a second-network attempt to establish said communication session with said multi-mobile station via said second wireless network; and if said predetermined response is unsuccessful because said multi-mode mobile station is found to be accessible via said first wireless network available but does not accept the communication session, providing said requester with at least one alternate communication option.

9. The method of claim 8, wherein said at least one alternate communication option is referring said requestor to a voicemail system.

10. The method of claim 8, wherein said first wireless network is a wireless local area network (WLAN).

11. The method of claim 10, wherein said second wireless network is a wireless wide area network (WWAN).

12. The method of claim 11, wherein making a first-network attempt comprises:
transmitting a Session Initiation Protocol (SIP) Invite message to a last known address of said multi-mode mobile station; and
waiting to receive from said multi-mode mobile station a predetermined response to said SIP Invite message, wherein said multi-mode mobile station is found to be inaccessible via said first wireless network if said predetermined response is not received within a predetermined period of time.

13. The method of claim 12, wherein said first predetermined response is a SIP 100 Trying message.

14. The method of claim 11, wherein making a first-network attempt comprises:
transmitting a Session Initiation Protocol (SIP) Invite message to a last known address of said multi-mode mobile station;
receiving a SIP 100 Trying message from said multi-mode mobile station, in response to said SIP Invite message;
receiving a SIP 180 Ringing message from said multi-mode mobile station, in response to said SIP Invite; and
waiting to receive a SIP 200 OK message from said multi-mode mobile station.

15. The method of claim 14, further comprising:
if said SIP 200 OK message is not received within a predetermined period of time, referring said requestor to a voicemail system.

16. The method of claim 10, wherein making a second-network attempt comprises:
transmitting a page message for said multi-mode mobile station via said second wireless network.

17. The method of claim 16, wherein making a second-network attempt further comprises:
transmitting an alert message for said multi-mode mobile station via said second wireless network.

18. A system for communicating with a multi-mode mobile station, said mobile station having a first interface for wireless communication with a first wireless network and a second interface for wireless communication with a second wireless network, system comprising:
a controller, communicatively coupled to said first wireless network and said second wireless network,
wherein in response to receiving a request from a requestor to establish a communication session with said multi-mode mobile station, said controller males a first-network attempt to establish said communication session with said multi-mode mobile station via said first wireless network and, if said multi-mode mobile station is found to be inaccessible via said first wireless network, said controller then makes a second-network attempt to establish said communication session with said multi-mobile station via said second wireless network, and if said multi-mode mobile station is found to be accessible via said first wireless network but does not accept said communication session, said controller then provides said requestor with at least one alternate communication option.

19. The system of claim 18, wherein said first wireless network is a wireless local area network (WLAN) and said second wireless network is a wireless wide area network (WWAN).

20. The system of claim 19, wherein said controller includes a softswitch.

* * * * *